Figure 5:
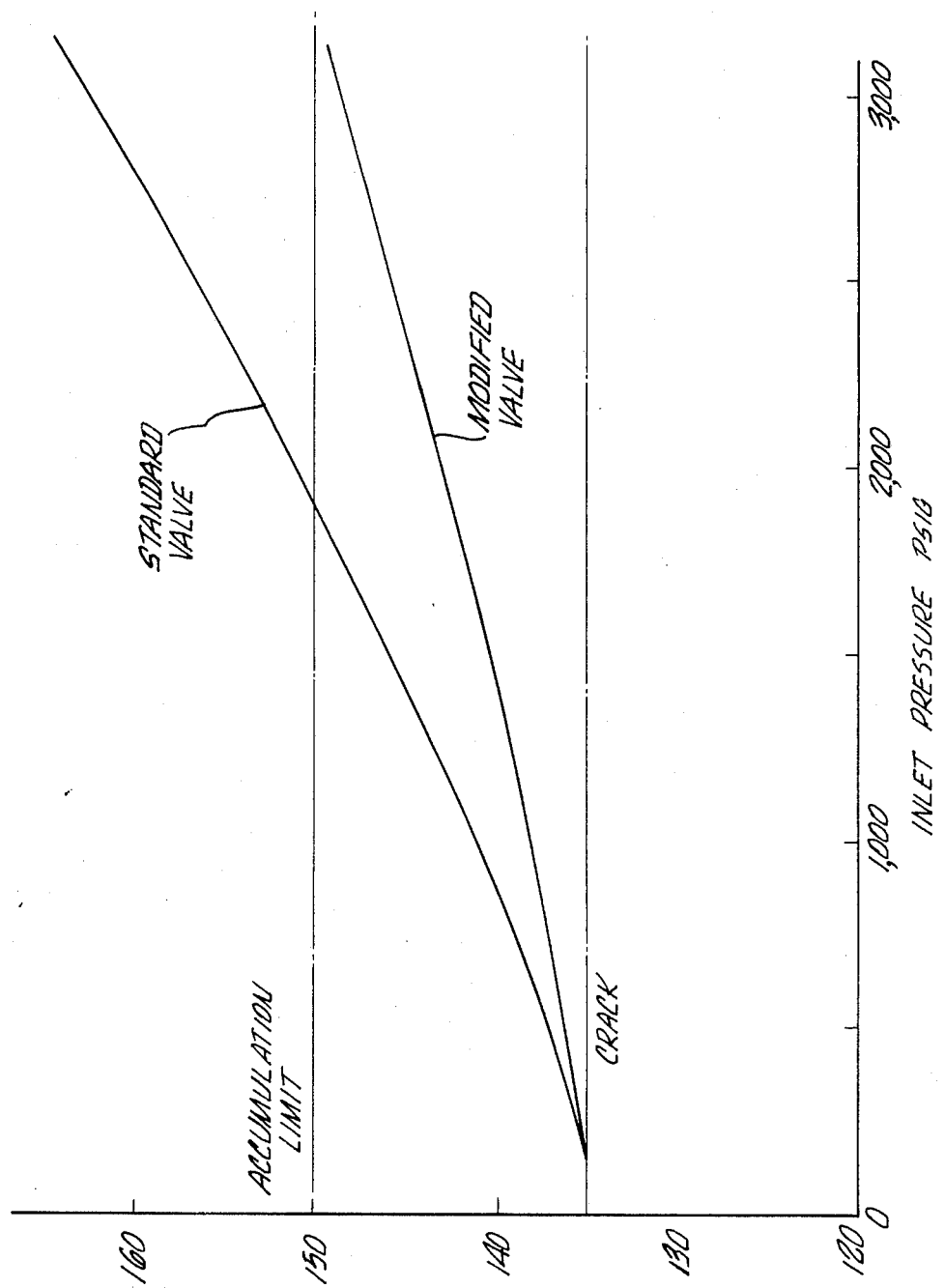

United States Patent [19]

Leighton

[11] Patent Number: 4,736,767

[45] Date of Patent: Apr. 12, 1988

[54] FLUID FLOW CONTROLLER

[75] Inventor: Francis Leighton, Woodland Hills, Calif.

[73] Assignee: Air Dry Corporation, Northridge, Calif.

[21] Appl. No.: 715,685

[22] Filed: Mar. 25, 1985

Related U.S. Application Data

[63] Continuation-in-part of Ser. No. 667,206, Nov. 1, 1984, abandoned, which is a continuation of Ser. No. 414,935, Sep. 3, 1982, abandoned.

[51] Int. Cl.⁴ .................... F16K 17/08; F16K 17/34
[52] U.S. Cl. .................................. 137/469; 137/484.8
[58] Field of Search ............... 137/469, 471, 484.4, 137/484.6, 484.8, 484.2

[56] References Cited

U.S. PATENT DOCUMENTS

| 1,994,320 | 3/1935 | McLaughlin | 137/484.2 UX |
| 2,387,363 | 10/1945 | Terry | 137/469 |
| 2,387,364 | 10/1945 | Terry | 137/469 |
| 3,873,063 | 3/1975 | Illing | 137/484.8 X |

Primary Examiner—Martin P. Schwadron
Attorney, Agent, or Firm—Sheldon & Mak

[57] ABSTRACT

A fluid flow controller utilizes a vacuum assist to decrease accummulation. The controller comprises a poppet and a poppet seat between the fluid inlet and the fluid outlet. An axially movable piston is connected to the poppet so that the piston and poppet move axially together. A high pressure chamber is at the pressure of the inlet fluid and a low pressure chamber is in fluid communication with the gap between the poppet and poppet seat. The difference in pressure between the two chambers is used to bias the poppet away from the poppet seat.

4 Claims, 6 Drawing Sheets

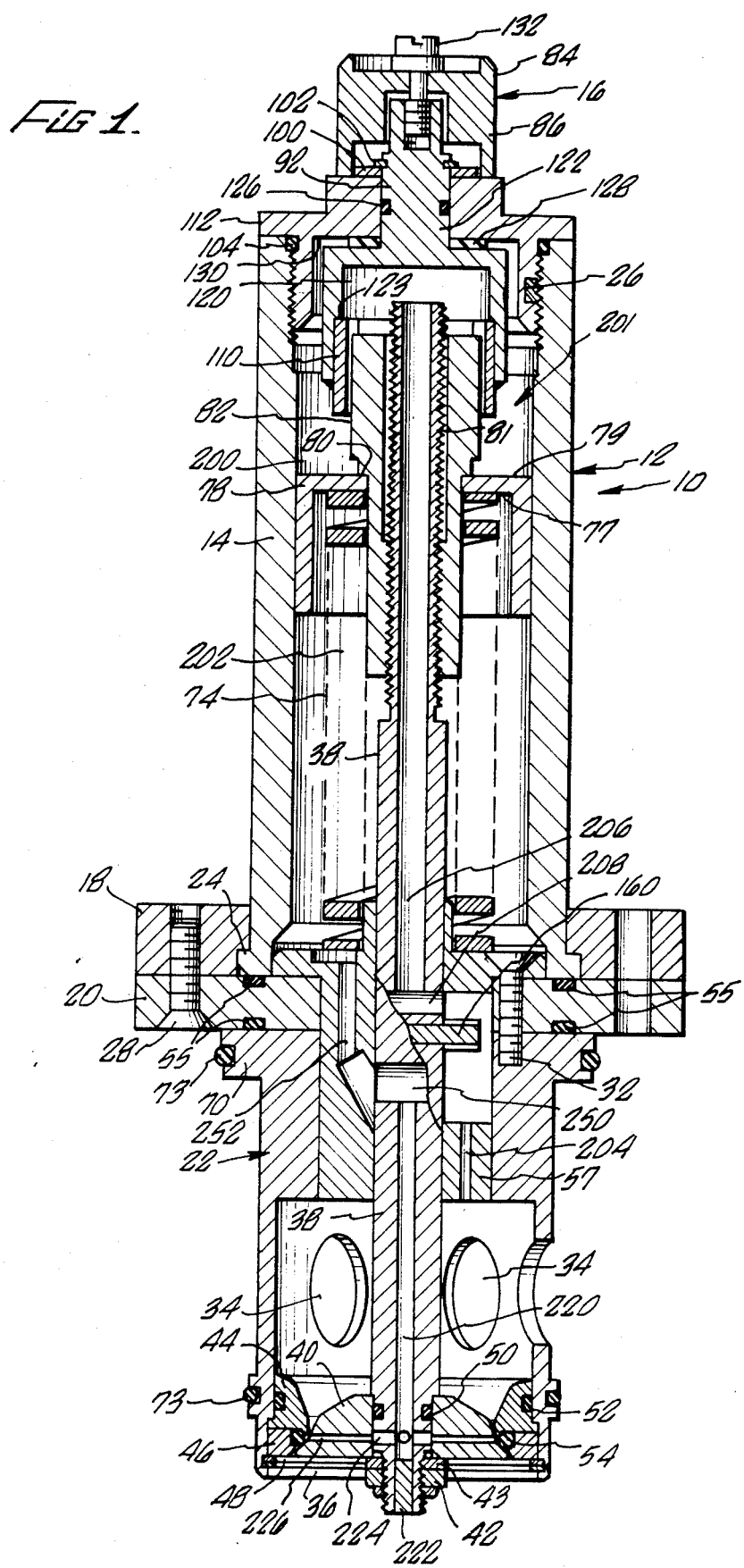

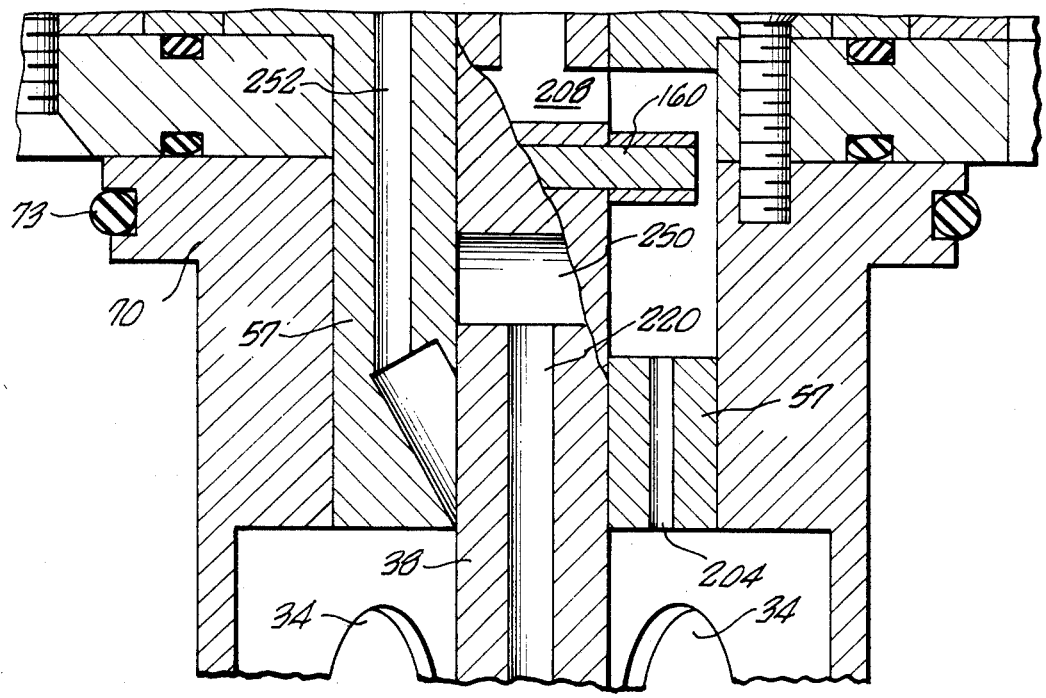
FIG_2.
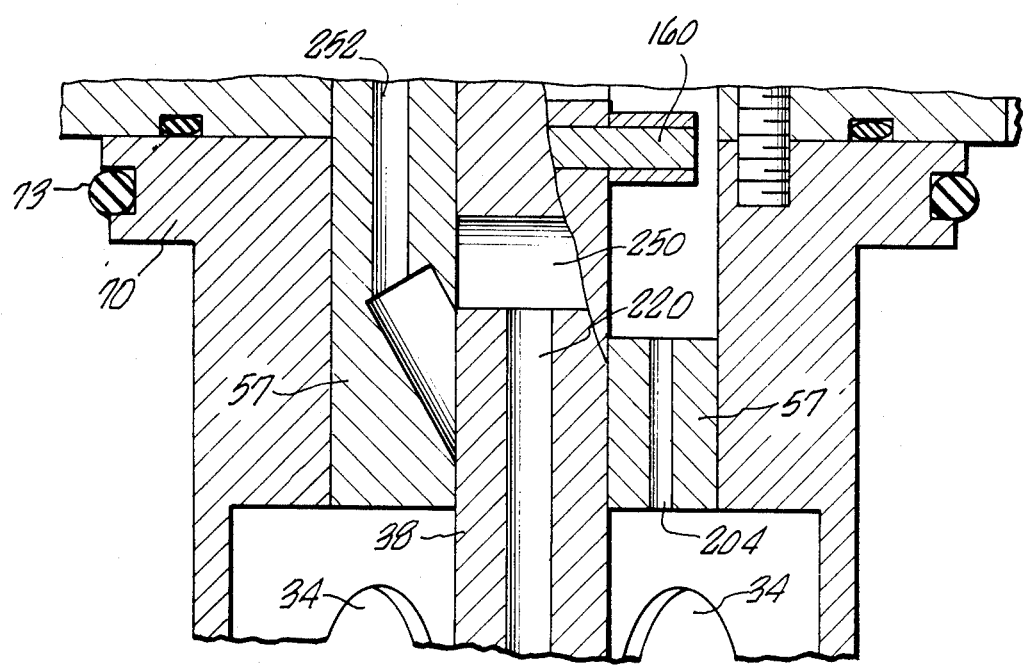
FIG_3.

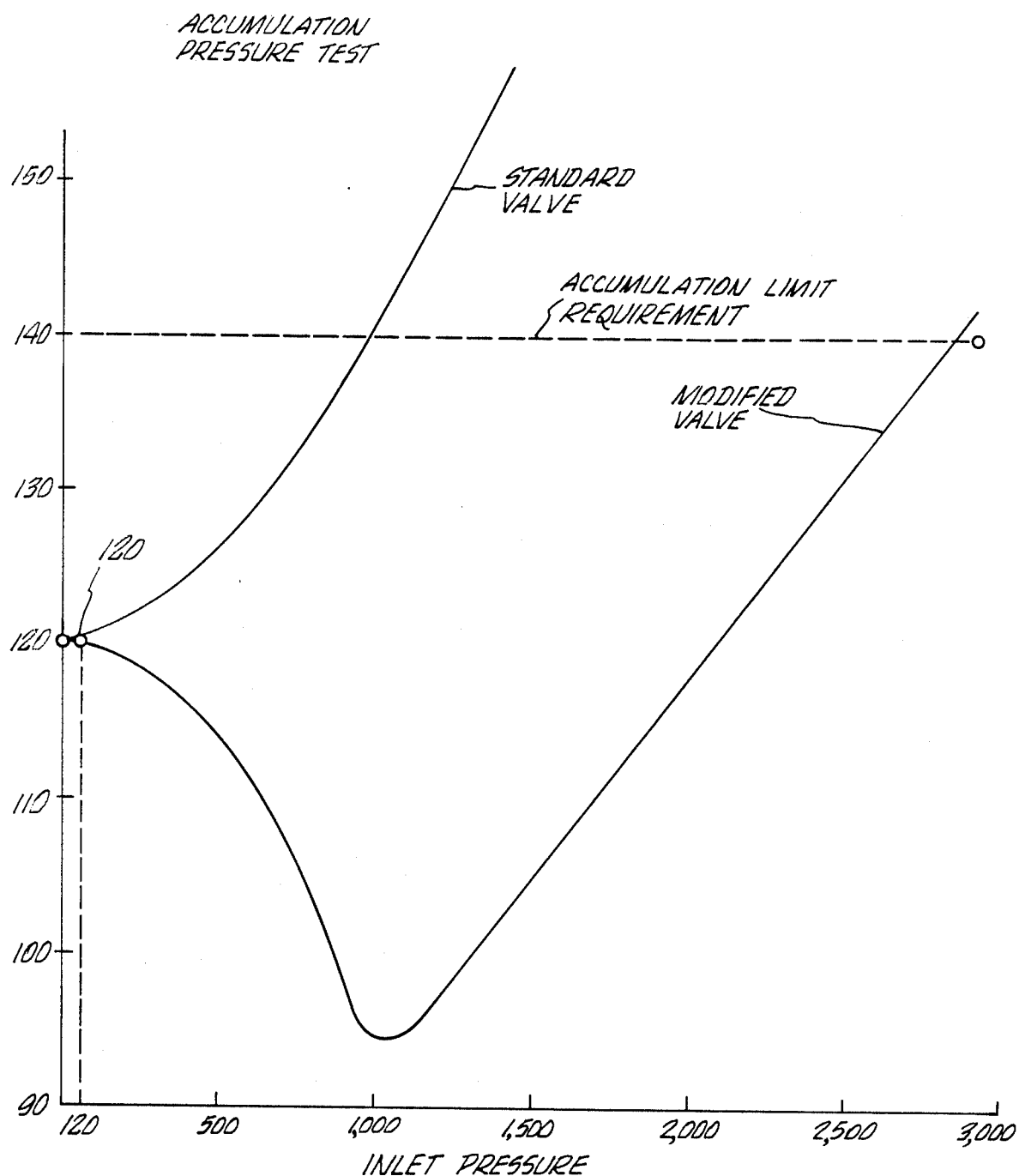

4,736,767

FLUID FLOW CONTROLLER

CROSS-REFERENCES

This application is a continuation-in-part of application Ser. No. 667,206 filed on Nov. 1, 1984, which is a continuation-in-part of application Ser. No. 414,935 filed Sept. 3, 1982, both now abandoned, both of which are incorporated herein by this reference.

BACKGROUND

The present invention relates to fluid flow controllers such as relief valves and safety valves.

Relief valves and safety valves are designed to open at a set pressure. A problem with these types of valves is accumulation. Accumulation is pressure build-up or over pressure beyond the set pressure of the valve. Accumulation can occur when the valve does not open a sufficient amount to allow sufficient fluid to pass therethrough.

Another problem sometimes noticed in safety and relief valves is that a valve does not seat completely or the valve seats too slowly when the inlet pressure is below the set pressure.

Another problem that can occur with safety valves and relief valves is that moisture and contaminants can accumulate in the valve, thereby adversely affecting the operation of the valve.

SUMMARY

The present invention is directed to a fluid flow controller that overcomes these problems. The controller comprises a casing having a fluid inlet and a fluid outlet. A poppet and a poppet seat are between the fluid inlet and the fluid outlet. The poppet is movable relative to the poppet seat to form a gap therebetween to allow fluid to flow from the fluid inlet to the fluid outlet through the gap. The pressure of fluid at the fluid inlet biases the poppet away from the poppet seat.

Biasing means such as a spring biases the poppet to engage the poppet seat. When the force exerted by the inlet fluid is greater than the force exerted by the biasing means, i.e., at the set pressure, the poppet moves away from the poppet seat.

The biasing means acts against a piston that is movable in the casing and that is connected to the poppet, such as by a shaft, so that the piston and poppet move together. The piston has first and second faces, with a low pressure chamber adjacent to the first face of the piston and a high pressure chamber adjacent to the second face of the piston. There is a first fluid passage between the fluid inlet and the high pressure chamber and a second fluid passage between the gap and the low pressure chamber.

When the poppet is spaced apart from the poppet seat, the flow of fluid across the gap aspirates or creates a vacuum in the low pressure chamber so that the pressure in the low pressure chamber is less than the pressure in the high pressure chamber. This difference in pressure creates a bias force on the piston that serves to move the poppet farther away from the poppet seat. This serves to lessen accumulation.

In a preferred version of the present invention, blocking means are provided to block the second fluid passage when the gap between the poppet and the poppet seat is relatively small. By blocking the fluid passage, the aspirating effect is eliminated, and the pressure in the low pressure chamber is no longer reduced. This decreases the differential pressure across the piston, thereby reducing the total force biasing the poppet away from the poppet seat. This helps assure that the poppet reseats at pressures below the set pressure.

Contaminants, water and water vapor present in the low pressure chamber seat tend to be aspirated into the fluid stream when the valve is open so that they do not interfere with the operation of the fluid flow controller.

DRAWINGS

These and other features, aspects and advantages of the present invention can be better understood with reference to the following description, appended claims, and accompanying drawings where each of FIGS. 1, 2, and 3, 6 and 7 show in vertical section relief valves in accordance with the present invention.

FIGS. 4 and 5 graphically present the results of tests comparing relief valves in accordance with the present invention against prior art relief valves.

DESCRIPTION

The present invention is directed to an improvement in fluid flow controllers. The fluid can be a gas or a liquid, although generally it is a gas under pressure. It can be used for any type of fluid flow controller, including, but not limited to, relief valves, control valves, pressure regulators, vacuum regulators, shutoff valves and the like. The present invention will be described below with regard to a relief valve used with high pressure air, i.e. air at 150 psi and greater However, as noted, the invention is not limited to air, to gases, and to relief valves.

Figure 6:
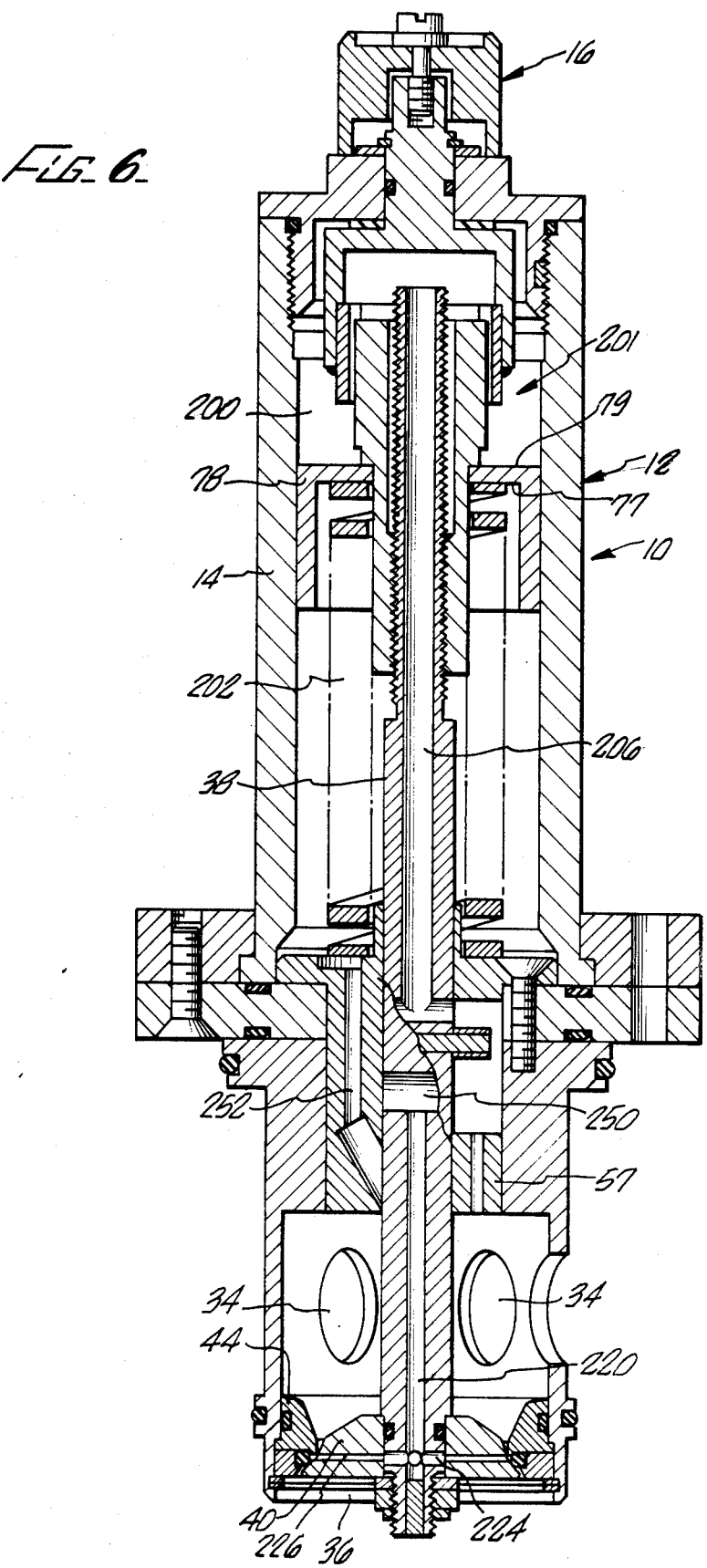
Figure 1:
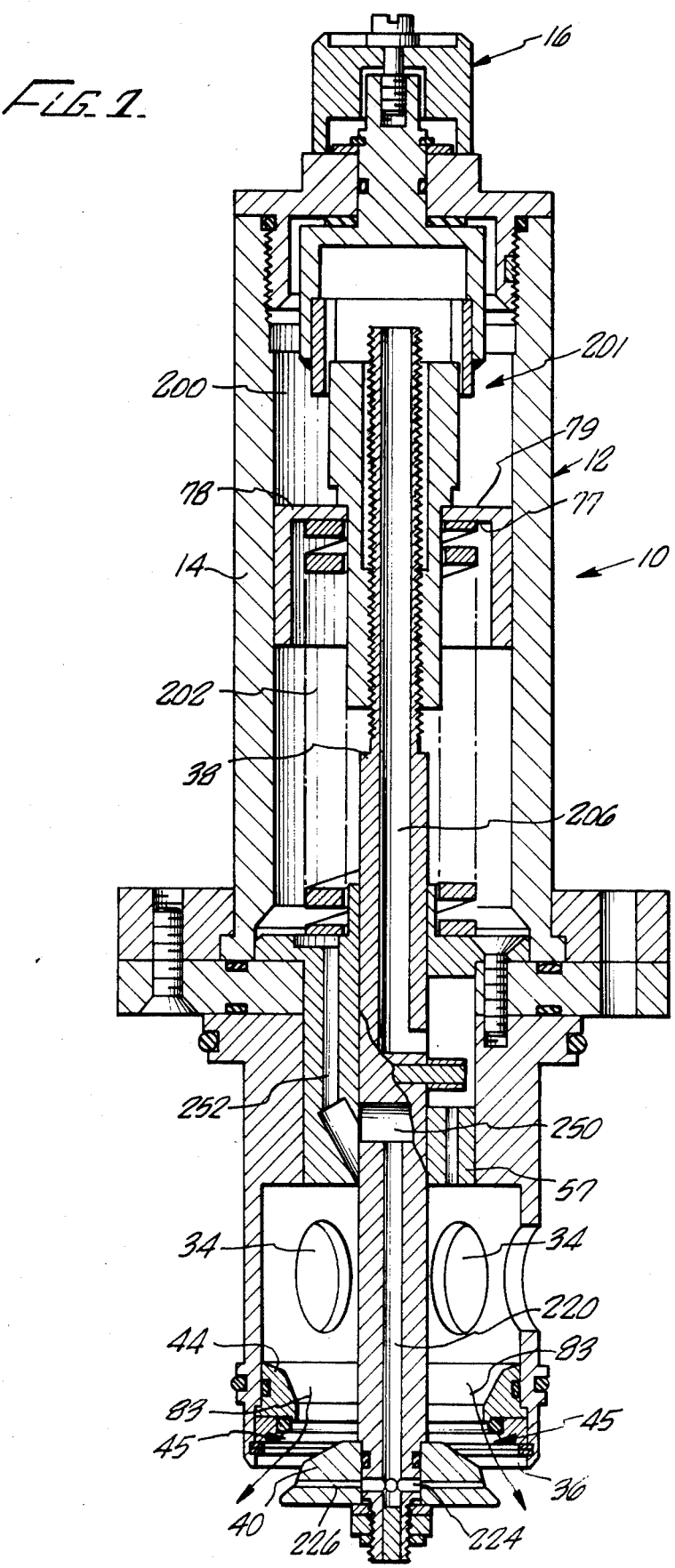

With reference to FIGS. 1, 6 and 7, a relief valve 10 has an external casing 12 comprised of a housing 14, a cap assembly 16, a first flange piece 18, a second flange piece 20, and a generally tubular nose piece 22. The housing 14 is elongated and tubular in shape with a radially outwardly projecting flange 24 at its base. The cap assembly 16 sits inside the housing 14 at the top thereof and is threaded into the top of the housing 14 and is prevented from releasing by a retaining member 26.

The first flange piece 18 is ring-shaped and sits on top of the flange 24 of the housing 14. The second flange piece 20 depends from the first flange piece 18 and is secured thereto by flat head screws 28 so that the flange 24 is clamped between the second flange piece 20 and the first flange piece 18.

The second flange piece 20 is disc-shaped, and has a thickened peripheral edge, through which the screws 28 extend. The second flange piece 20 has an axial hole through its middle.

The nose piece 22 depends from the second flange piece 20 and is secured thereto by a plurality of screws 32.

The nose piece 22 is provided with a plurality of radially oriented inlet holes 34 for incoming gas and an axially oriented outlet hole or vent 36 in fluid communication with the inlet holes 34. The outlet vent 36 is at the base of the nose piece 22.

Within the housing 12 is a mechanism that prevents gas at the inlet holes 34 from passing to the outlet vent 36 unless the inlet gas pressure is higher than a set pressure. This mechanism comprises an axially moveable shaft 38 which is threaded at its ends and at its base supports a poppet 40 which is held in place by a locknut 42 and washer 43. The poppet 40 prevents fluid from flowing from the inlet holes 34 to the outlet vent 36 by engaging a poppet seat 44 mounted within the nose piece 22. The poppet seat 44 is held in position by a retainer 46, which in turn is locked into the nose piece 22 by a retainer ring 48 mounted within the nose piece 22 adjacent the outlet vent.

To prevent fluid leakage from the inlet to the outlet, a plurality of O-rings or packing is provided, including packing 50 between the poppet and the shaft 38, an O-ring 52 between the seat 44 and the inner wall of the nose piece 22, and packing 54 between the seat retainer 46 and the seat 44.

Packing 55 is provided between the second flange piece 20 and the nose piece 22 and between the second flange piece 20 and the housing 14.

The nose piece 22 has an axial hole therethrough aligned with the axial hole through the second flange piece 20. The shaft 38 extends through the aligned holes. The shaft 38 can slide axially within the casing 12. A first sleeve 57 surrounds the shaft 38 in the region of the top portion of the nose piece 22, the first flange piece 18, and the second flange piece 20.

The nose piece 22 is of smaller diameter than the second flange piece 20. At the top of the nose piece 22 is a radially outwardly extending flange 70. The flange 70 and the outlet position of the nose piece 22 are provided with packing 73 at the radial face of the nose piece so that fluid-tight engagement can be made with the means (not shown) used for providing the inlet gas to the inlets 34.

Inlet gas pressure tends to cause the poppet 40 and the shaft 30 to move axially downwardly so that inlet gas can pass to the outlet 36, through a gap between the poppet 40 and the seat 44. The shaft 38 is biased against axial movement in response to inlet pressure by an adjustable axially oriented spiral spring 74. The spring 74 is mounted between the first sleeve 57 at one end and a cup-shaped spring retainer 78 at the other end. The retainer 78 is seated against a shoulder 80 of a second sleeve 82 that is threaded onto a threaded portion 81 of the shaft 38 proximate to the cap assembly 16.

The means for biasing the spring retainer 78 against axial movement of the retainer can be springs, such as spring 74, so that no fluid passes from the inlet holes 34 to the outlet vent 36. When the inlet fluid has a sufficiently high pressure that the force it exerts on the poppet 40 is greater than the force exerted by the spring, then fluid can pass from the inlet to the vent. This occurs because the inlet fluid pressure causes the poppet 40 and the shaft 38 to move axially downwardly. The poppet 40 moves away from the seat 44, allowing fluid to flow as shown by arrows 83 in FIG. 1.

The spring 74 is adjustable in that the compression on it can be varied. The adjustment is provided with the cap assembly 16 which includes a cover assembly 84 having a skirt 86 mounted on an end cap 112. Extending into the housing 14 and protected by the cover assembly 84 is a spring adjusting cap 92. Between the skirt 86 and the main body of the spring adjusting cap 92 is a washer 100 held in place by retaining ring 102. The end cap 112 is threaded into the housing 14 and packing 104 is provided between the inside wall of the housing 14 and the radially outward wall of the end cap 112.

Spring adjustment is provided by an internally splined spring adjuster 110. The spring adjuster 110 is cup-shaped and nests into an external spline of the second sleeve 82. The spring adjusting cap 92 has a depending inverted cup shape portion 120 with a recess 123 in the cup-shaped portion 120 firmly attached to the inner spring adjustor 110. The washer 100 sits on the end cap 112 and packing 126 is provided between the outer wall of the spring adjusting cap 92 and the inner bore of the end cap 112. Also, a thrust washer 128 is situated between the end cap face 130 that faces axially and the adjacent face of the spring adjusting cap 92. A fillister head screw 132 extends through the cover assembly 84 into the main body 122 of the spring adjusting cap 92.

The compression on the spring 74 is adjusted by unscrewing and removing the cover assembly 84. By turning the spring adjusting cap 92, which in turn turns the spring adjuster 110, the second sleeve 82 is rotated around the shaft 38 with the second sleeve 82 being threaded either upwardly or downwardly on the threaded portion 81 of the shaft 38. This correspondingly moves the spring retainer 78 either upwardly or downwardly, thereby changing the amount of compression on the spring 74.

Because the spring 74 is under compression, it exerts a force that is transmitted by the spring retainer 78 and the second sleeve 82 to the shaft 78, biasing the shaft in a direction which pulls the poppet 40 toward the poppet seat 44, thereby opposing the biasing force of inlet gas. As the spring adjusting cap 92 is rotated clockwise (from above), the amount of compression on the spring 74 increases, thereby increasing the amount of pressure required from the inlet fluid for the poppet 40 to move from the poppet seat. Thus, moving the spring adjusting cap 92 clockwise increases the set pressure, and moving the spring adjusting cap 92 counter-clockwise, reduces the set pressure of the valve 10.

The shaft 38 itself is kept from rotating as the second sleeve 82 is rotated by a radially oriented pin 160 that extends radially outwardly from the shaft 38 into the first sleeve 57.

According to the present invention, the spring retainer 78 acts much as a piston and divides the interior of the casing 12 into a high pressure chamber 200 and a low pressure chamber 202. The high pressure chamber 200 is the region between the spring retainer 78 and the end cap assembly 16 and the low pressure chamber 202 is the region between the spring retainer 78 and the first sleeve 57.

Pressurization of the high pressure chamber is provided by the high pressure inlet fluid. Fluid communication is established through a plurality of high pressure axial passages 204 extending from the inlets 34 through the first sleeve 57 and first axial passages 206 extending from a middle portion of the shaft 38 all the way to the end of the shaft adjacent to the underside of the cap assembly 16. Radially oriented passages 208 in the shaft connect the axially oriented high pressure passage 206 of the shaft with the axially oriented high pressure passage 204 of the first sleeve 57. Because of these passages, the high pressure chamber 200 is under pressure about equal to the pressure of the inlet fluid.

The low pressure chamber 202 communicates with fluid passing through the gap between the poppet 40 and the poppet seat 44. The shaft 38 at the gap includes an axially oriented low pressure passage 220 plugged by plug 222. This low pressure passage 220 includes radially oriented legs 224 adjacent the poppet 40, which has aligned radially oriented passages 226 therethrough, the ends of which are positioned at the location of the gap that forms between the poppet 40 and the poppet seat 44. The other end of the low pressure passage 220 through the shaft 38 terminates in a radially oriented opening 250 that is in communication with generally axially oriented low pressure passage 252 extending through the first sleeve 57 to the low pressure chamber 202.

In operation of the valve 10, when the inlet fluid pressure is greater than the set pressure, the poppet 40 moves away from the poppet seat 44, allowing fluid to pass out through the exit 36. This aspirates fluid from the low pressure chamber 202 through passage 252, opening 250, and passages 220, 224, and 226. This creates a difference in pressure between the high pressure chamber 200 and the low pressure chamber 202, which forces the spring retainer or piston 78 to increase the compression on the spring 74. This tends to further bias the poppet 40 away from the poppet seat 44, thereby increasing the size of the gap between the poppet and the poppet seat, which increases the fluid flow, which increases aspiration. This reduces the accumulation downstream of the valve 10. Moreover, any moisture or contaminants which may be present in the poppet flow passage and low pressure chamber 202 are aspirated downstream.

As shown in FIG. 1 the opening 250 and the low pressure passage 252 through the sleeve 57 are aligned when the valve is closed. If desired, as shown in FIGS. 2 and 3 the opening 250 and passage 252 could be positioned so that alignment occurs only when the valve is open at least a small amount. In this version of the invention, as the inlet pressure is reduced, and the poppet moves closer to the poppet seat, eventually the passage to the low pressure chamber is blocked. Thus, the vacuum assist provided by a low pressure chamber is lost, the compression of the spring 74 is reduced, and it is easier for the poppet to reseat. This assists the valve in completely shutting off when the inlet fluid pressure is less than the set pressure.

Within the scope of the invention as illustrated in FIGS. 6 and 7 there are means for removably blocking the second fluid passage. The blocking means blocks the low pressure fluid passage when there is no gap between the poppet and the poppet seat. Alternatively the blocking means blocks the low pressure fluid passage when the gap is a first size and does not block the low pressure fluid passage when the gap is a second size, the second size being larger than the first size.

Also by the invention as illustrated in FIGS. 6 and 7 the shaft passage and sleeve passage may not be aligned when there is no gap between the poppet and the poppet seat. Alternatively the shaft passage and the sleeve passage are not aligned when the gap between the poppet and the poppet seat is a first size, and the shaft passage and the sleeve passage are aligned when the gap between the poppet and the poppet seat is a second size, the second size being larger than the first size.

EXAMPLES

Tests were conducted to compare the efficiency of valves according to the present invention in reducing accumulation compared to prior art valves. In a first test, Air-Dry valve Catalog No. 6153-96, a prior art relief valve, was compared to the same valve modified in accordance with the present invention. In a second test, Air-Dry Pressure Relief Valve 6153-57-2, a prior art valve, was compared to the same valve modified in accordance with the present invention.

All four valves tested included a casing, a fluid inlet, a fluid outlet, and a poppet and poppet seat between the inlet and the outlet, with the poppet being moveable relative to the poppet seat. In all four valves, fluid passed from the inlet to the outlet when there was a gap between the poppet and the poppet seat.

The two valves modified according to the present invention had a high pressure chamber in the casing, a first fluid passage means between the fluid inlet and the high pressure chamber, a low pressure chamber in the casing, and a second fluid passage between the gap and the low pressure chamber so that the flow of fluid through the gap between the poppet and the poppet seat caused the pressure in the low pressure chamber to be less than the pressure in the high pressure chamber. The difference in pressure between the two chambers biased the poppet away from the poppet seat.

Thus, the two modified valves had the configuration of the valve shown in FIG. 1.

In the first test the valves were set to open at 120 psig. The valves were tested with high pressure air. The results of the test with the 6153-96 unaspirated valve and the 6153-96 aspirated valve are show in FIG. 4. FIG. 4 shows that a plot of accumulation pressure versus inlet air pressure. It will be noted that the unaspirated valve had accumulation of 140 psig at an inlet pressure of 950 psig, while the aspirated valve did not have 140 psig accumulation until an inlet pressure of about 2900 psig. In fact, the accumulation pressure of the aspirated valve was less than the cracking or set pressure of 120 psig until the inlet pressure was about 2000 psig.

FIG. 5 shows the results of the test with the unaspirated 6153-57-2 relief valve compared to the same aspirated valve. In this test, the set or crack pressure was set for 135 psig with an accumulation limit of 150 psig. The unaspirated valve exceeded the accumulation pressure limit at only about 1900 psig, while the aspirated valve did not exceed the accumulation pressure limit even at inlet pressures greater than 3000 psig.

Although the present invention has been described in considerable detail with reference to certain preferred versions thereof, other versions are possible. Therefore the spirit and scope of the appended claims should not necessarily be limited to the description of the preferred versions contained herein.

I claim:
1. A fluid flow controller comprising:
   (a) a casing having a longitudinal axis, a fluid inlet, and a fluid outlet;
   (b) a poppet and a poppet seat between the fluid inlet and the fluid outlet, the poppet being axially movable relative to the poppet seat to form a gap therebetween to allow fluid to flow from the fluid inlet to the fluid outlet through the gap, wherein the pressure of fluid at the fluid inlet biases the poppet away from the poppet seat;
   (c) piston means having first and second faces, the piston means being axially movable in the casing;
   (d) a shaft in the casing connecting the piston to the poppet so that the piston and poppet move axially together in the casing;
   (e) a spring biasing the piston in a direction which causes the poppet to engage the poppet seat;
   (f) a high pressure chamber adjacent the second face of the piston, the pressure of fluid in the high pressure chamber opposing the force of the spring;
   (g) a first fluid passage between a fluid inlet and the high pressure chamber;

(h) a low pressure chamber adjacent the first face of the piston;

(i) a second fluid passage between the gap and the low pressure chamber, at least a portion of the second passage extending axially through the shaft; and (j) means removably blocking the second fluid passage, said means including a sleeve around at least a portion of the shaft whereby the sleeve blocks fluid passage through the passage in the shaft in a first position of the poppet and permits fluid passage in a second position of the poppet.

2. The controller of claim 1 wherein the sleeve is non-movable axially and the shaft moves axially, the second fluid passage including a passage through the sleeve and at least a partially radially orientated passage through the shaft.

3. The controller of claim 2 wherein the shaft passage and the sleeve passage are not aligned when there is no gap between the poppet and poppet seat.

4. The controller of claim 2 wherein the shaft passage and the sleeve passage are not aligned when the gap between the poppet and the poppet seat is a first size, and the shaft passage and the sleeve passage are aligned when the gap between the poppet and the poppet seat is a second size, the second size being larger than the first size.

* * * * *